United States Patent
Liu et al.

(10) Patent No.: US 10,747,358 B2
(45) Date of Patent: Aug. 18, 2020

(54) POSITION DETECTION CIRCUIT AND POSITION DETECTION METHOD

(71) Applicant: Wacom Co., Ltd., Saitama (JP)

(72) Inventors: JuiMin Liu, Tokyo (JP); Shigeyuki Sano, Kanagawa (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/279,160

(22) Filed: Feb. 19, 2019

(65) Prior Publication Data

US 2019/0258352 A1    Aug. 22, 2019

Related U.S. Application Data

(60) Provisional application No. 62/634,030, filed on Feb. 22, 2018.

(30) Foreign Application Priority Data

Oct. 5, 2018 (JP) .................. 2018-189838

(51) Int. Cl.
*G06F 3/045* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 3/04186* (2019.05); *G06F 3/0446* (2019.05)

(58) Field of Classification Search
CPC .... G06F 3/041; G06F 3/0416; G06F 3/04186; G06F 3/044; G06F 3/0446
See application file for complete search history.

(56) References Cited

U.S. PATENT DOCUMENTS

| | | | | |
|---|---|---|---|---|
| 6,239,788 B1 * | 5/2001 | Nohno | .................. | G06F 3/0412 |
| | | | | 178/18.03 |
| 8,199,126 B1 * | 6/2012 | Taubman | ................ | G06F 3/011 |
| | | | | 345/156 |
| 9,024,643 B2 * | 5/2015 | Schwartz | ................ | G06F 3/044 |
| | | | | 324/676 |
| 9,104,282 B2 * | 8/2015 | Ichikawa | ............... | G06F 3/0416 |
| 9,720,541 B2 * | 8/2017 | Berget | .................. | G06F 3/0416 |
| 9,927,925 B2 * | 3/2018 | Teranishi | ................ | G06F 3/044 |

(Continued)

FOREIGN PATENT DOCUMENTS

JP    2012-88899 A    5/2012

*Primary Examiner* — Joe H Cheng
(74) *Attorney, Agent, or Firm* — Seed IP Law Group LLP (57) ABSTRACT

A position detection circuit and position detection method are provided to enable more flexible position detection even if an object is present above a touch sensor. The position detection circuit is connected to a capacitive touch sensor formed with a plurality of line electrodes that are two-dimensionally arranged. At least one memory device stores processor-readable instructions that, when executed by at least one processor device, cause the position detection circuit to: recognize an electrically conductive object located above a touch sensor based on two-dimensional data indicating detection values regarding capacitance, and detect a touch position or touch area on the touch sensor based on the two-dimensional data using different touch detection conditions for an outside and an inside of an area where the object is present.

15 Claims, 11 Drawing Sheets

(56) References Cited

U.S. PATENT DOCUMENTS

| | | | | |
|---|---|---|---|---|
| 10,379,682 | B2* | 8/2019 | Hayashi | G06F 3/0412 |
| 2003/0132922 | A1* | 7/2003 | Philipp | G06F 3/0418 |
| | | | | 345/173 |
| 2007/0132724 | A1* | 6/2007 | Muranaka | G06F 1/1626 |
| | | | | 345/156 |
| 2007/0242053 | A1* | 10/2007 | Muranaka | G06F 3/044 |
| | | | | 345/173 |
| 2008/0062140 | A1* | 3/2008 | Hotelling | G09G 3/3648 |
| | | | | 345/173 |
| 2008/0252608 | A1* | 10/2008 | Geaghan | G06F 3/044 |
| | | | | 345/173 |
| 2009/0213090 | A1* | 8/2009 | Mamba | G06F 3/044 |
| | | | | 345/174 |
| 2009/0284492 | A1* | 11/2009 | Chino | G06F 3/0412 |
| | | | | 345/174 |
| 2010/0060609 | A1* | 3/2010 | Doi | G06F 3/044 |
| | | | | 345/174 |
| 2010/0309162 | A1* | 12/2010 | Nakanishi | G06F 3/044 |
| | | | | 345/174 |
| 2010/0328259 | A1* | 12/2010 | Ishizaki | G06F 3/044 |
| | | | | 345/174 |
| 2014/0253501 | A1* | 9/2014 | Noguchi | G02F 1/13338 |
| | | | | 345/174 |
| 2016/0291792 | A1* | 10/2016 | Sawahata | G06F 3/0412 |
| 2016/0357345 | A1* | 12/2016 | Ichikawa | G06F 3/044 |
| 2019/0258337 | A1* | 8/2019 | Liu | G06F 3/04186 |

* cited by examiner

POSITION DETECTION CIRCUIT AND POSITION DETECTION METHOD

BACKGROUND

Technical Field

The present disclosure relates to a position detection circuit and a position detection method.

Background Art

Patent Document 1 (Japanese Patent Laid-open No. 2012-088899) discloses a touch panel apparatus. If an object contacting a mutual capacitance capacitive touch panel is determined as a water drop, the touch panel apparatus invalidates output of coordinate values corresponding to the water drop in order to prevent operation errors.

However, the apparatus disclosed in Patent Document 1 (Japanese Patent Laid-open No. 2012-088899) has a problem that it does not allow flexible position detection. For example, if a finger is moved while a coin is pressed against the touch surface, this motion of the finger is not detected as a series of touch manipulation.

BRIEF SUMMARY

An object of the present disclosure is to provide a position detection circuit and position detection method that enables performance of more flexible position detection even if a foreign object is present above a touch sensor.

A position detection circuit according to a first aspect of the present disclosure is a circuit connected to a capacitive touch sensor formed with a plurality of line electrodes that are two-dimensionally arranged. The position detection circuit includes at least one processor device; and at least one memory device storing processor-readable instructions that, when executed by the at least one processor device, cause the position detecting circuit to: acquire two-dimensional data indicating a distribution of detection values regarding capacitance on the touch sensor; recognize an electrically conductive object located above the touch sensor based on the acquired two-dimensional data; and detect a touch position or touch area on the touch sensor based on the two-dimensional data using different touch detection conditions for an outside and an inside of an area where the recognized object is present.

A position detection method according to a second aspect of the present disclosure is a position detection method using a capacitive touch sensor formed with a plurality of line electrodes that are two-dimensionally arranged. The method is performed by one or more processors and includes: acquiring two-dimensional data indicating a distribution of detection values regarding capacitance on the touch sensor; recognizing an electrically conductive foreign object located above the touch sensor based on the acquired two-dimensional data; and detecting a touch position or touch area on the touch sensor based on the two-dimensional data using different touch detection conditions for an outside and an inside of an area where the recognized object is present.

The present disclosure allows more flexible position detection even if an object is present above a touch sensor.

DETAILED DESCRIPTION OF THE PREFERRED EMBODIMENTS

A position detection circuit and position detection method according to the present disclosure are explained with reference to the attached figures. It should be noted that the present disclosure is not limited to the following embodiments and variants, but can certainly be changed at will as long as such changes do not deviate from the main points of the present disclosure. Alternatively, individual configurations can be combined as desired as long as such combinations do not cause technical contradictions.

[Configuration of Electronic Device 10]

<Overall Configuration>

Figure 1:
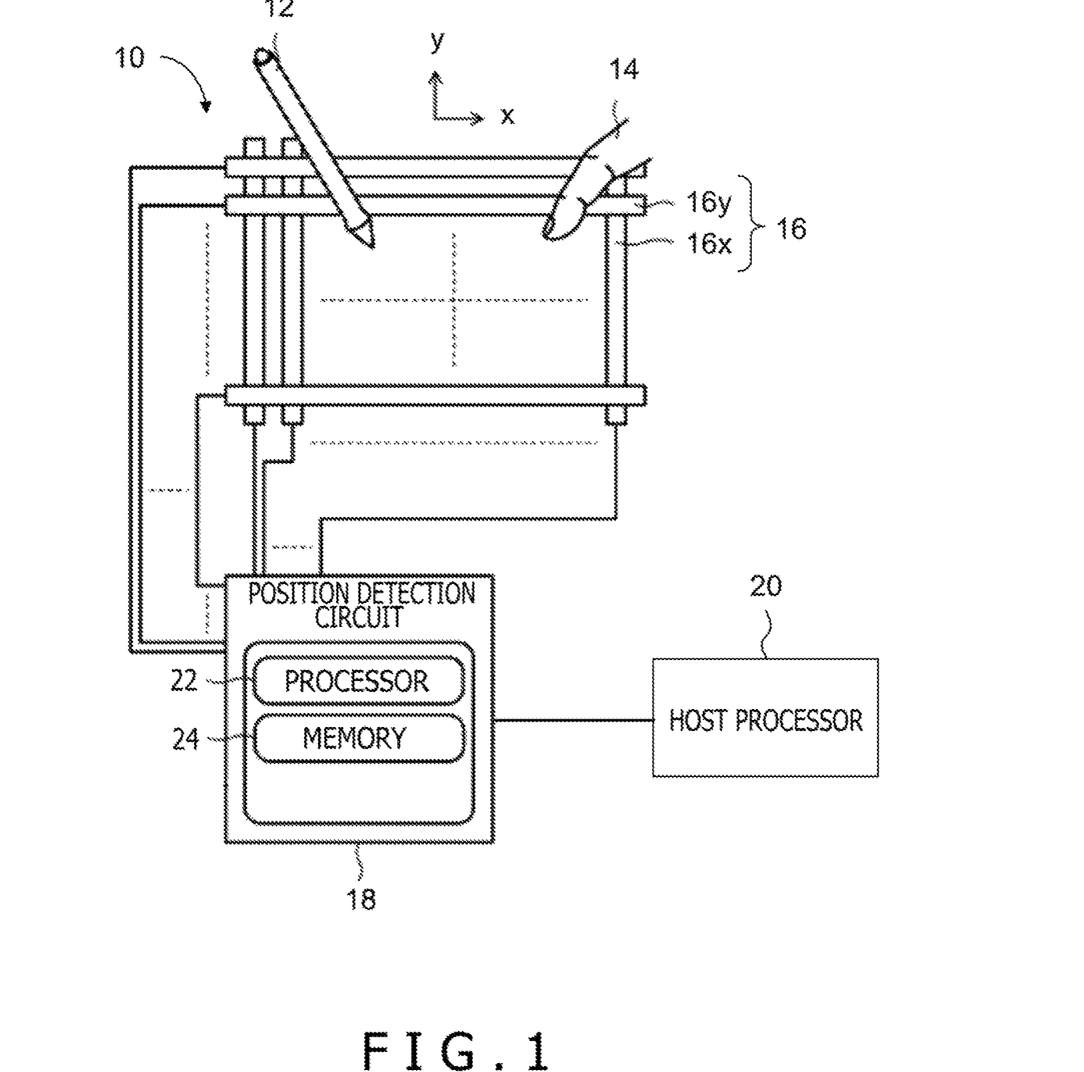
FIG. 1 is a schematic block diagram of an electronic device into which a position detection circuit according to one embodiment of the present disclosure is incorporated.

FIG. 1 is a schematic block diagram of an electronic device 10 into which a position detection circuit 18 according to one embodiment of the present disclosure is incorporated. The electronic device 10 is configured as a tablet terminal, a smartphone or a personal computer, for example. A user holds an electronic pen 12 (or a stylus) with one of his/her hands, and moves it while pressing its pen point against a touch surface 24 (please see FIG. 2A or other figures) of a display panel which is not illustrated to thereby be able to draw pictures or write characters in the electronic device 10. Alternatively, the user brings his/her finger 14 of into contact with the touch surface 24 to thereby be able to perform desired manipulation through a user control being displayed.

This electronic device 10 includes and constituted by a capacitive touch sensor 16, the position detection circuit 18 and a host processor 20. It should be noted that the x direction and y direction depicted in the figure correspond to the X axis and Y axis of an orthogonal coordinate system defined on a plane formed by the touch sensor 16.

The touch sensor 16 includes and is constituted by a plurality of electrodes arranged on the display panel. The touch sensor 16 includes a plurality of line electrodes 16x for detecting X coordinates (positions in the x direction), and a plurality of line electrodes 16y for detecting Y coordinates (positions in the y direction). The plurality of line electrodes 16x is provided to extend in the y direction and additionally is arranged at constant intervals along the x direction. The plurality of line electrodes 16y is provided to extend in the x direction and additionally is arranged at constant intervals along the y direction.

The position detection circuit 18 is an integrated circuit, for example, including at least one processor device 22 configured to execute processor-readable instructions stored in at least one memory device 24, and is connected to each among the plurality of electrodes constituting the touch sensor 16. The instructions are configured to be able to realize a touch detection function of a detecting touch of the finger 14 or the like of the user and a pen detection function of detecting a state of the electronic pen 12.

The touch detection function, for example, includes a function of two-dimensionally scanning the touch sensor 16, a function of acquiring two-dimensional data 30 on the touch sensor 16 (FIG. 7B), and a function of classifying areas in the two-dimensional data 30 (for example, classification of the finger 14 and the palm of a hand). The pen detection function, for example, includes a function of two-dimensionally scanning the touch sensor 16, a function of receiving and analyzing downlink signals, a function of estimating the state of the electronic pen 12 (for example, the position, posture and pen pressure), and a function of generating and sending uplink signals including commands on the electronic pen 12.

The host processor 20 is a processor consisting of a Central Processing Unit (CPU) or a Graphics Processing Unit (GPU). The host processor 20 reads out and executes a program from a program which is not illustrated to thereby, for example, perform a process of generating digital inks using data from the position detection circuit 18, a visualization process for displaying drawing contents indicated by the digital inks, and so on.

<Functional Requirements of Position Detection Circuit 18>

Figure 2A:
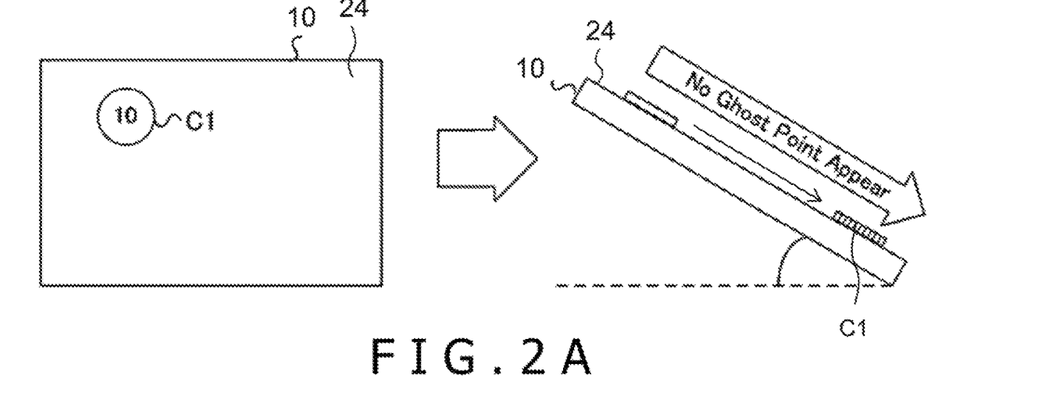
FIG. 2A and FIG. 2B are schematic diagrams depicting functional requirements of the position detection circuit in FIG. 1.
Figure 2B:
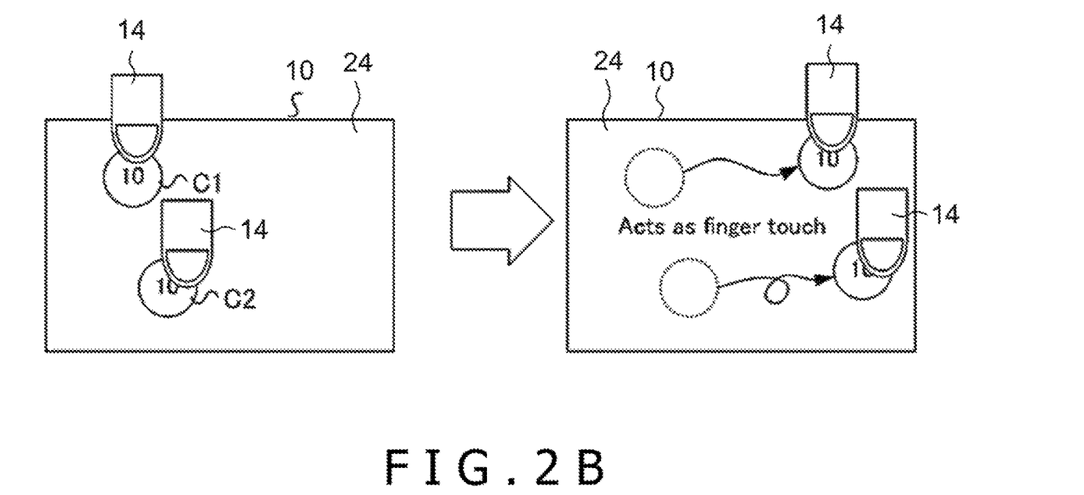

FIG. 2A and FIG. 2B are schematic diagrams depicting functional requirements about the position detection circuit 18 in FIG. 1.

As depicted on the left half of FIG. 2A, an electrically conductive foreign object C1 such as a coin or a water drop is located on the touch surface 24 of the electronic device 10. If the electronic device 10 is tilted in this state, the foreign object C1 slides down the touch surface 24 due to its own weight. As a first functional requirement, even if the foreign object C1 moves on the touch surface 24 while at the same time being in contact with the touch surface 24 as depicted on the right half of FIG. 2A, it is not be detected as a series of touch manipulation.

As depicted on the left half of FIG. 2B, there are two foreign objects C1 and C2 located on the touch surface 24 of the electronic device 10, and additionally the user is pressing the foreign objects C1 and C2 with his/her fingers 14. By moving the fingers 14 in this state, the foreign objects C1 and C2 move following the motion of the finger 14. As a second functional requirement, even if the foreign objects C1 and C2 are interposed as depicted on the right half of FIG. 2B, the motion of the finger 14 is detected as a series of touch manipulation.

[Operation of Position Detection Circuit 18]

<Tendency of Detection of Capacitance>

The position detection circuit 18 in the present embodiment has the above-mentioned configuration. Next, the tendency of detection of capacitance by the touch sensor 16 under various use conditions is explained with reference to FIG. 3A to FIG. 5B.

Figure 3A:
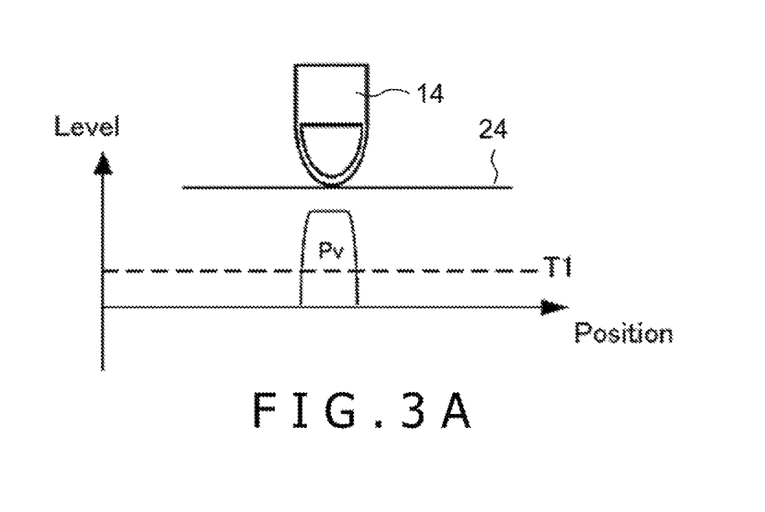
FIG. 3A and FIG. 3B are figures depicting distributions of signal levels in a state in which a finger of a user is in contact with a touch surface.

FIG. 3A is a figure depicting a one-dimensional distribution of signal levels in a state in which the finger 14 of the user is in contact with the touch surface 24. The horizontal axis of the graph indicates positions (Position) along one axis direction, and the vertical axis of the graph indicates signal levels (Level). The signal levels correspond to detection values regarding capacitance (mutual capacitance or self capacitance), and are set to have plus or minus signs such that they become "positive" when the finger 14 is in contact.

Figure 3B:
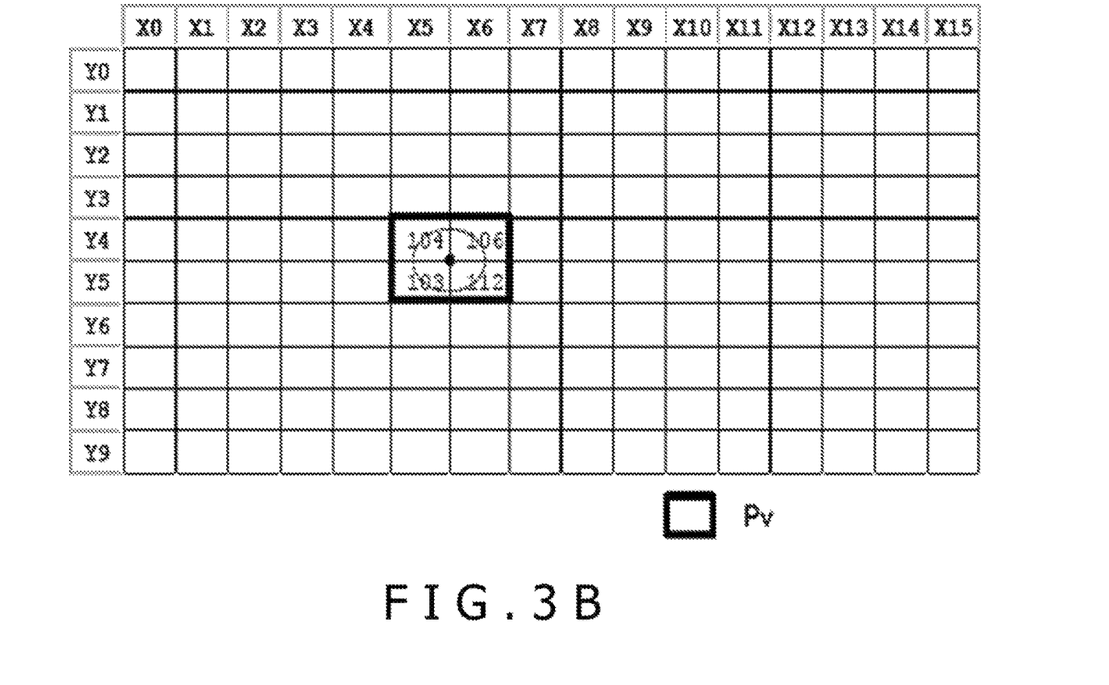

FIG. 3B is a figure depicting a two-dimensional distribution of signal levels in the state in which the finger 14 of the user is in contact with the touch surface 24. The value of each cell indicates a signal level at each two-dimensional position. For convenience of illustration, cells with signal levels close to a reference value (=0) are depicted with numbers being omitted therefrom. It should be noted that a single cell or a group of cells surrounded by a bold line frame indicates/indicate a position where a positive signal level Pv is detected.

As can be understood from FIG. 3A and FIG. 3B, signal levels far exceeding a threshold T1 are detected in a small range corresponding to a contact portion of the finger 14 along with contact of the finger 14.

Figure 4A:
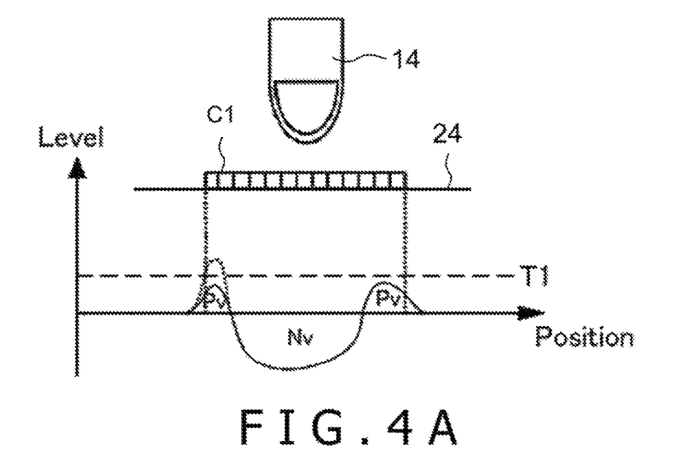
FIG. 4A and FIG. 4B are figures depicting distributions of signal levels in a state in which a foreign object is on the touch surface and additionally a finger is not in contact with the foreign object (ungrounded state)
Figure 4B:
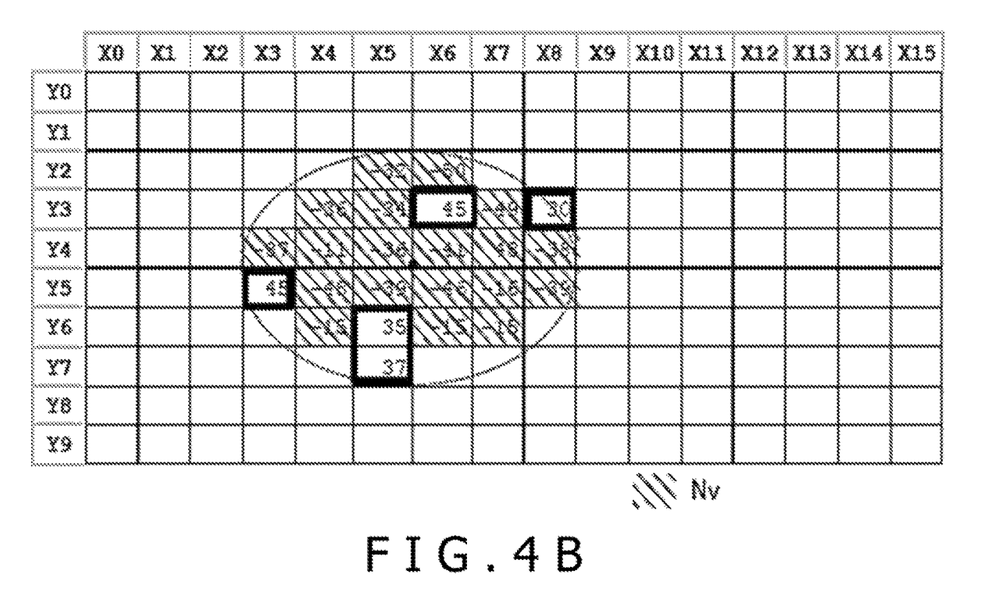

FIG. 4A and FIG. 4B are figures depicting distributions of signal levels in the state where the foreign object C1 is on the touch surface 24 and additionally the finger 14 is not in contact with the foreign object C1 (ungrounded state). In more detail, FIG. 4A depicts a one-dimensional distribution, and FIG. 4B depicts a two-dimensional distribution. As can be understood from FIG. 4A and FIG. 4B, not only small areas with positive signal levels Pv but also small areas with signal levels Nv with negative values are mixedly present in the area where the foreign object C1 is present.

Figure 5A:
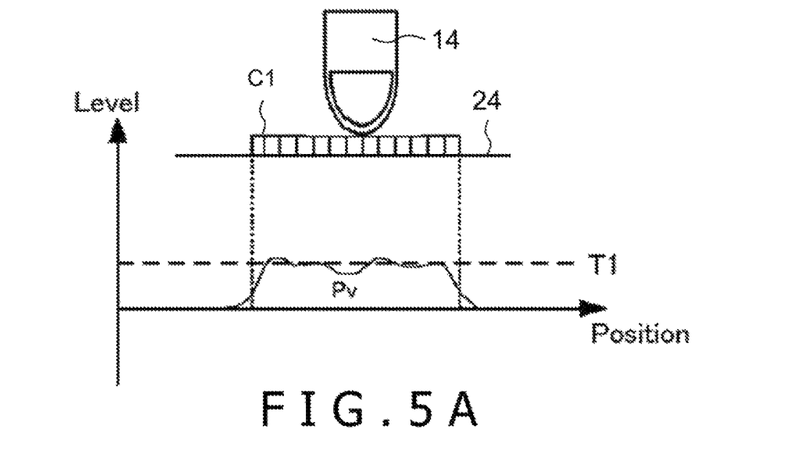
FIG. 5A and FIG. 5B are figures depicting distributions of signal levels in a state in which a foreign object is on the touch surface and additionally a finger is in contact with the foreign object (grounded state)
Figure 5B:
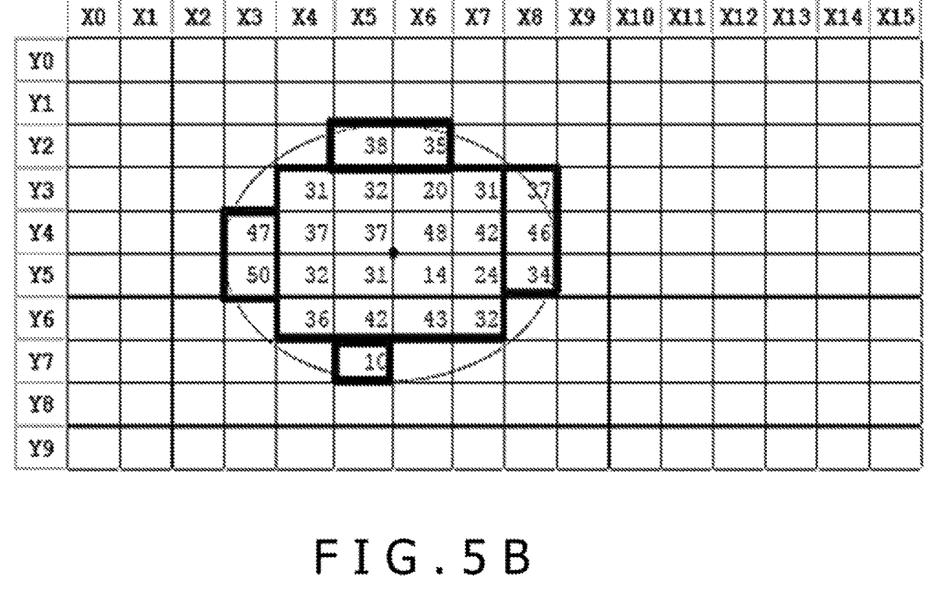

FIG. 5A and FIG. 5B are figures depicting distributions of signal levels in a state in which the foreign object C1 is on the touch surface 24 and additionally the finger 14 is in contact with the foreign object C1 (grounded state). In more detail, FIG. 5A depicts a one-dimensional distribution, and FIG. 5B depicts a two-dimensional distribution.

Along with contact of the finger 14, negative signal levels Nv disappear, and relatively low positive signal levels Pv start being detected in a large range corresponding to the contact portion of the foreign object C1. A reason for this is assumed to be that although the amount of electric charges Q absorbed from the finger 14 does not change much irrespective of the presence or absence of the foreign object C1, the contact area of the foreign object C1 is larger than the contact area of the finger 14, and the amount of absorption of electric charges per unit size decreases.

<Specific Operation>

In view of the detection tendency explained above, the two functional requirements (please see FIG. 2A and FIG. 2B) can be realized simultaneously. In the following, specific operation of the position detection circuit 18 is explained with reference to the flowchart in FIG. 6. It should be noted that this operation may be performed by one processor (position detection circuit 18) or may be performed by a plurality of processors in cooperation with each other.

At S1 in FIG. 6, the position detection circuit 18 receive input of detection signals indicating detection values regarding capacitance on the touch sensor 16, and acquires distribution data indicating a position distribution of detection levels (hereinafter, referred to also as the two-dimensional data 30).

At S2, the position detection circuit 18 recognizes the electrically conductive foreign object C1 located above the touch sensor 16 (that is, the foreign object C1 in contact with the touch surface 24) based on the two-dimensional data 30 acquired at S1.

Figure 7A:
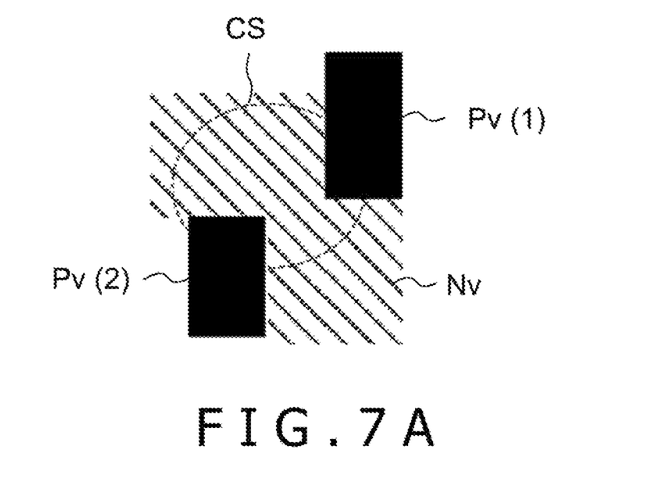
FIG. 7A is a figure depicting an exemplary foreign object recognition process at S2.

FIG. 7A is a figure depicting an exemplary foreign object recognition process at S2. In this process, a pattern larger than the contact range of the finger 14 (hereinafter, referred to also as a coin pattern) is recognized, and the coin pattern is extracted as a recognition area 32. As explained above, such a coin pattern does not generate an area where areas with positive signal levels Pv and areas with negative signal levels Nv are distinctly separated, but actually generates an area where small areas of the two types are mixedly present. The portions that are painted out correspond to small areas where positive signal levels Pv(1) and Pv(2) are detected, and the hatched portion corresponds to small areas where negative signal levels Nv are detected. Accordingly, when a coin pattern is to be recognized, recognition conditions desirably include that signal levels with different signs are mixedly present, instead of detecting the boundary (edges) between areas.

In addition to this, or instead of this, a recognition condition about the size of the recognition area 32 may be included. Specifically, an area having a size larger than predetermined size CS may be extracted as the recognition area 32. A reason for this is that the above-mentioned problems in terms of manipulation of the electronic device 10 cannot occur in an area that is sufficiently smaller than a water drop, a coin or the like. It should be noted that the size of an area can be obtained for example based on the number of data points at which the absolute values of signal levels are above a threshold and that are adjoining each other to form a cluster.

Figure 7B:
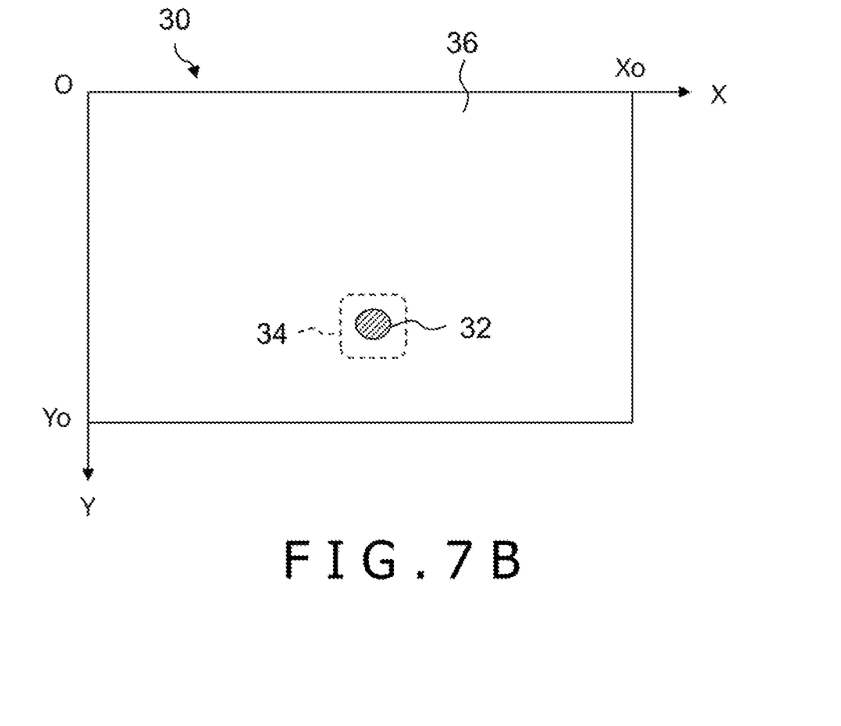
FIG. 7B is a figure depicting one example of a foreign object recognition result.

FIG. 7B is a figure depicting an exemplary result of recognizing the foreign object C1. The two-dimensional data 30 is defined in a predetermined entire rectangular area (0≤X≤Xo, 0≤Y≤Yo). The closed area indicated by hatching corresponds to the recognition area 32 of the foreign object C1. In addition, the area surrounded by a broken line corresponds to the recognition area 32 itself or a foreign object present area 34 further including surrounding portions of the recognition area 32 (an area where the foreign object C1 is present). On the other hand, the remaining area of the entire area excluding the foreign object present area 34 corresponds to a normal detection area 36 where the foreign object C1 is not present.

Figure 6:
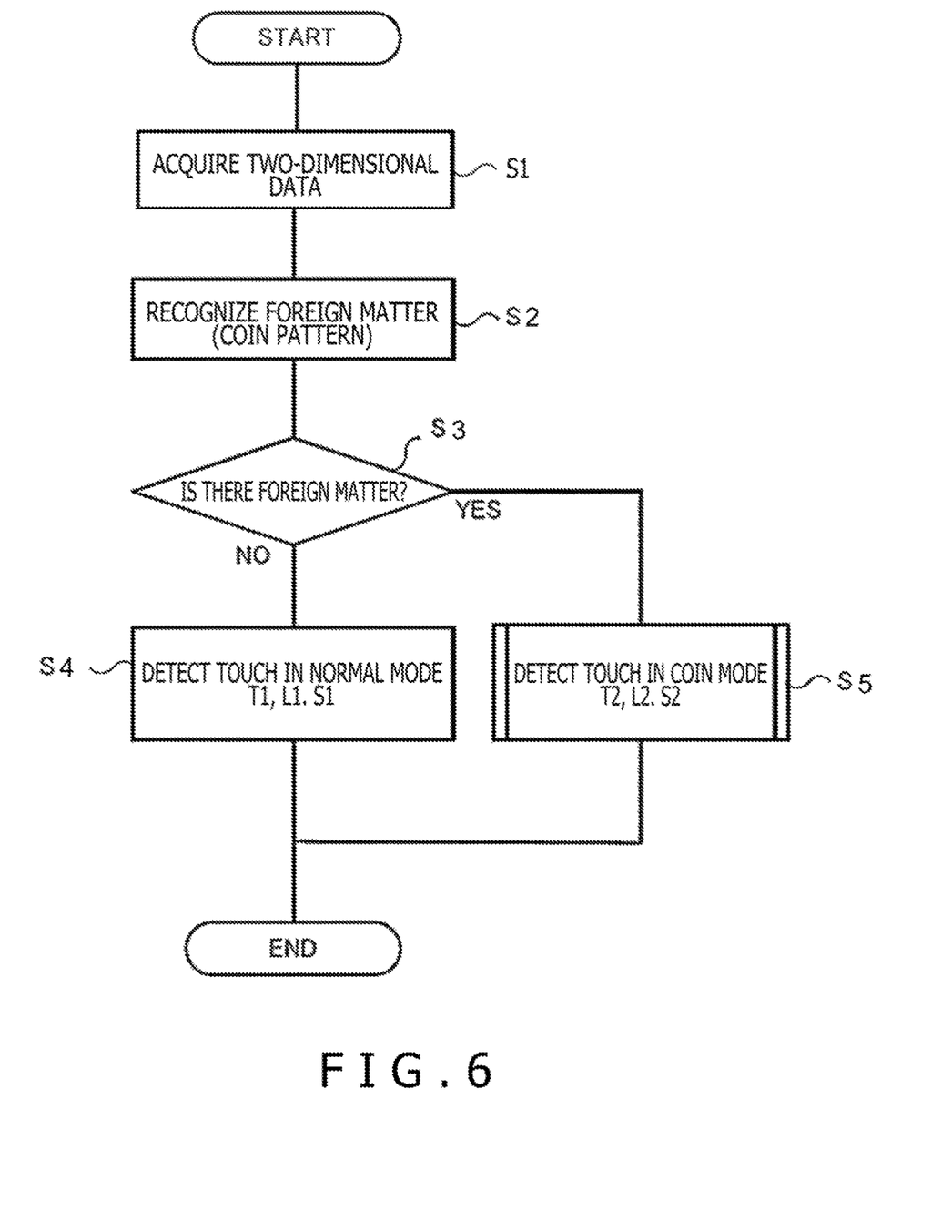
FIG. 6 is a flowchart of a position detection method performed by the position detection circuit in FIG. 1.

If at S3 in FIG. 6, the foreign object C1 (coin pattern) is not recognized in the two-dimensional data 30 (S3; NO), the position detection circuit 18 performs a touch detection process in a normal mode (S4). In this normal mode, touch positions or touch areas are detected in the entire area of the touch sensor 16 based on normal touch determination conditions. Specifically, [A] finger determination of determining whether or not the finger 14 is in contact with the touch surface 24, [B] single object determination of determining whether adjoining touch areas correspond to contact of a single continuum (so-called single touch) or to simultaneous contact of separate continuums (so-called multi touch), and [C] palm determination of determining whether or not a palm is in contact with the touch surface 24 are performed.

In the "finger determination," touch areas where detection values indicated by the two-dimensional data 30 are higher than the threshold T1 (detection threshold) are extracted, and a representative point (for example, the centroid position) of the touch areas is detected as a position indicated by the finger 14. In the "single object determination," if touch areas where detection values indicated by the two-dimensional data 30 are higher than the threshold T1 are extracted, and an index indicating a change amount of detection values between adjoining touch areas is lower than a threshold L1 (change amount threshold), both the touch areas are regarded and detected as a single area. In the "palm determination," if touch areas where detection values indicated by the two-dimensional data 30 are higher than the threshold T1 are extracted, and an index indicating the size of the touch areas is higher than a threshold S1 (size threshold), the touch areas are deemed not as corresponding to an indication intended by the user, and are excluded from touch areas.

On the other hand, returning to S3, if at least one foreign object C1 is recognized in the two-dimensional data 30 (S3; YES), the position detection circuit 18 performs a touch detection process in a coin mode (S5). In this coin mode, a process of detecting touch positions or touch areas in the two-dimensional data 30 is performed using different touch determination conditions for the outside and inside of the foreign object present area 34.

Here, the "different touch determination conditions" may include: [1] that parameters (for example, thresholds) used in determination processes are different; [2] that methods of calculating indices used in determination processes are different; [3] combinations/the number of conditions among a plurality of determination conditions are different; and [4] combinations of [1] to [3] explained above. In the following, an exemplary touch detection process in the coin mode performed at S5 is explained in detail with reference to a flowchart in FIG. 8 and FIG. 9 to FIG. 11.

Figure 8:
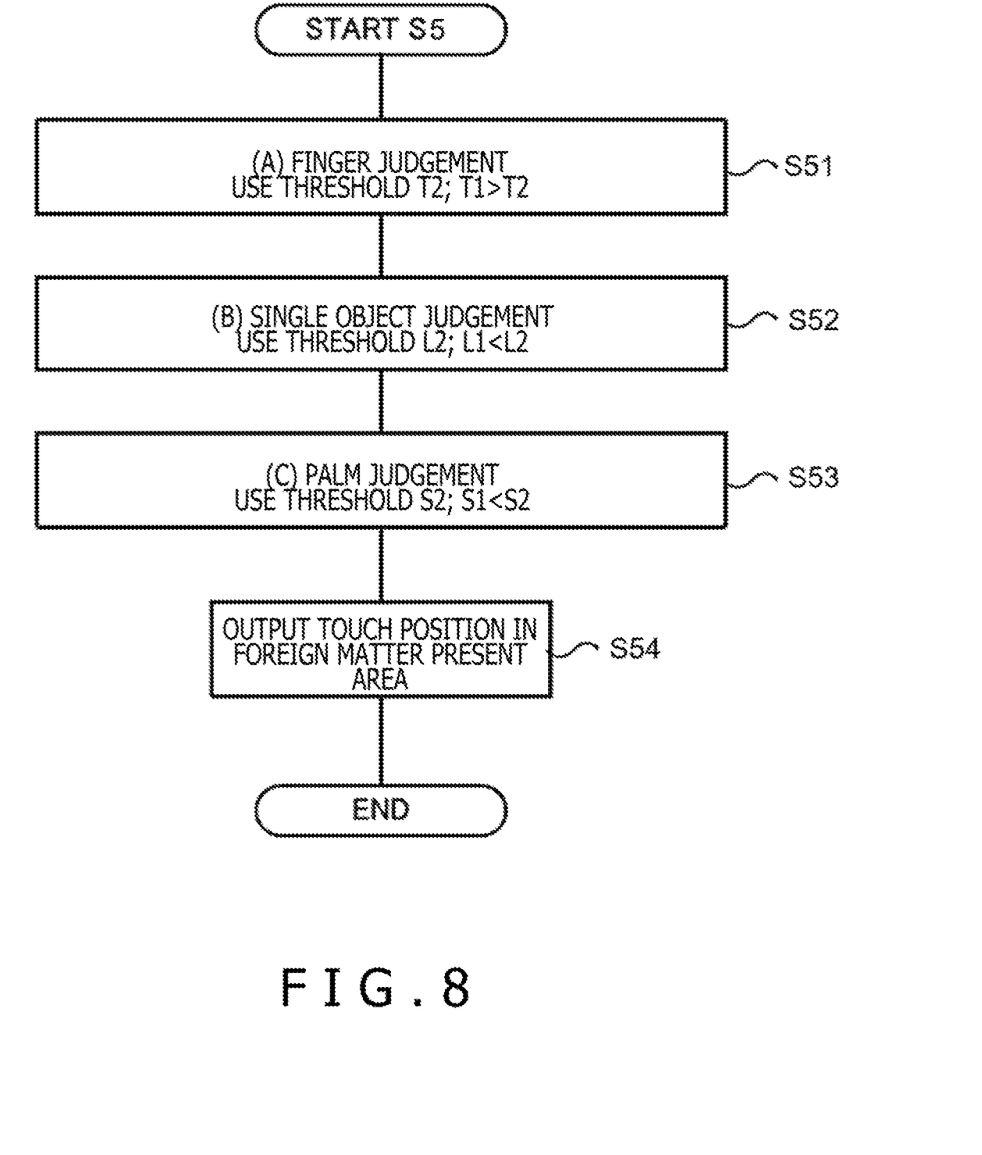
FIG. 8 is a detailed flowchart of a touch detection process in a coin mode to be executed at S5 in FIG. 6.
Figure 9:
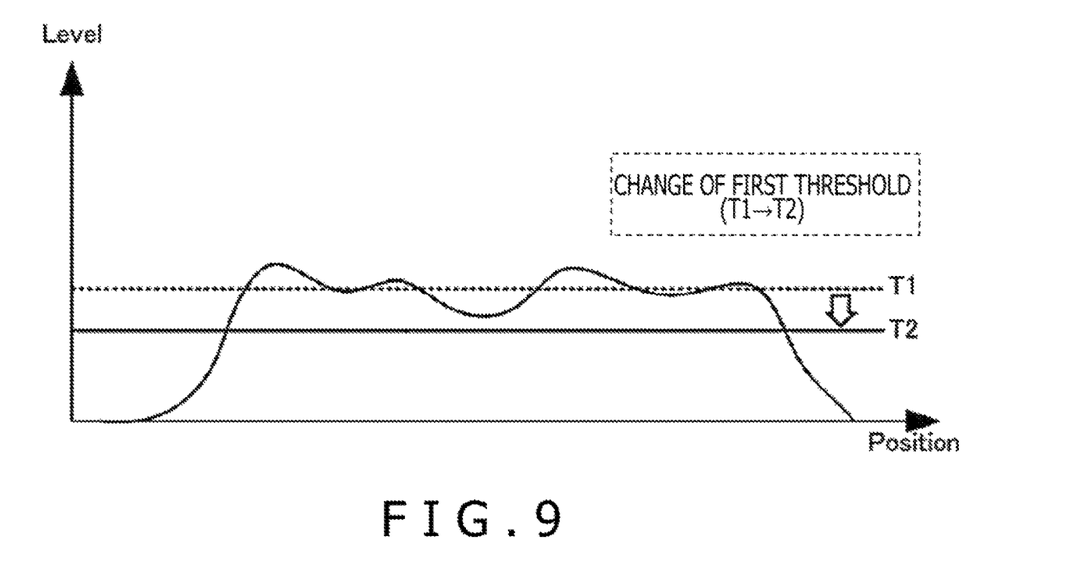
FIG. 9 is a schematic diagram depicting an effect of improving finger determination following a change of threshold (T1→T2)

First, at S51 in FIG. 8, the position detection circuit 18 performs the "finger determination" using a threshold T2 lower than the threshold T1 used in the normal mode. As can be understood from the relationships depicted in FIG. 3A and FIG. 5A, positive signal levels Pv based on which contact of the finger 14 is detected tend to lower relatively due to interposition of the foreign object C1. In view of this, in the coin mode, the threshold T2 is used instead of the threshold T1 to increase the touch detection sensitivity. Thereby, as depicted in FIG. 9, touch of the finger 14 can be detected even if the foreign object C1 is interposed.

Figure 10:
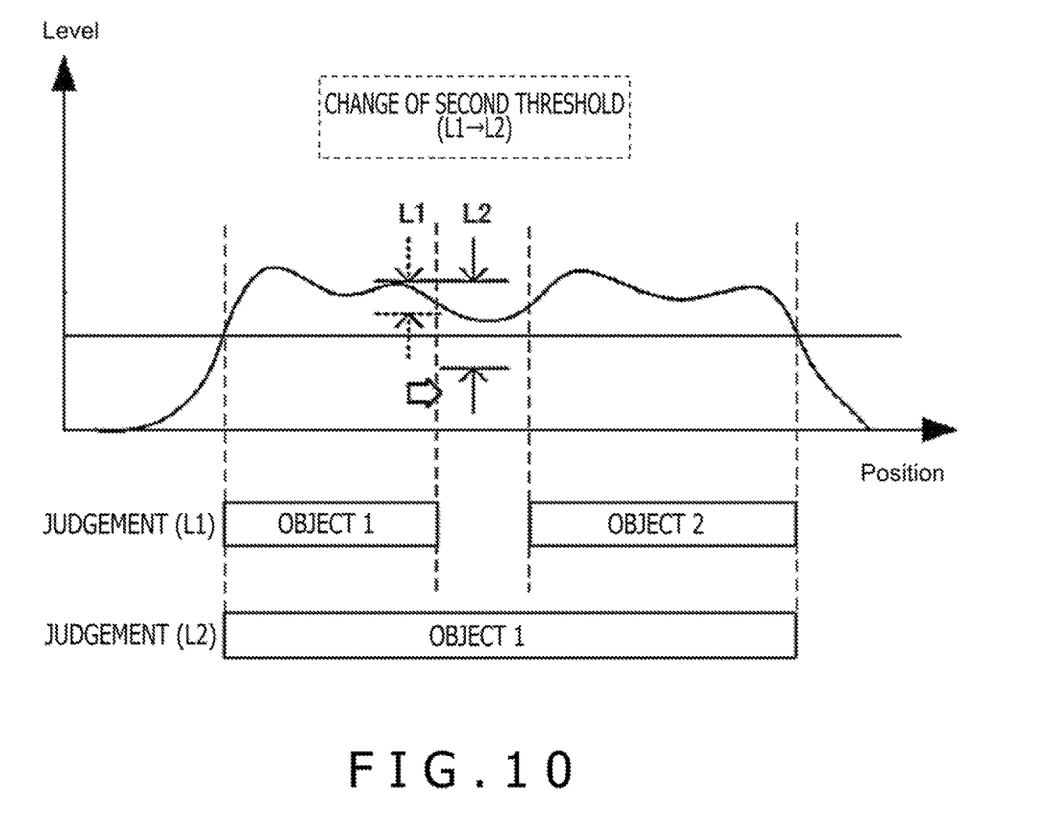
FIG. 10 is a schematic diagram depicting an effect of improving single object determination following a change of threshold (L1→L2)

Next, at S52, the position detection circuit 18 performs the "single object determination" using a threshold L2 higher than the threshold L1 used in the normal mode. As can be understood from the relationships depicted in FIG. 3A and FIG. 5A, the range over which positive signal levels Pv appear becomes larger relatively due to interposition of the foreign object C1, and the tendency of easily detecting discontinuity is facilitated by a corresponding degree. In view of this, in the coin mode, the threshold L2 is used instead of the threshold L1 to lower the discontinuity detection sensitivity. Thereby, as depicted in FIG. 10, the foreign object C1 can be detected as a single object even in a state in which the finger 14 is in contact with the foreign object C1.

Figure 11:
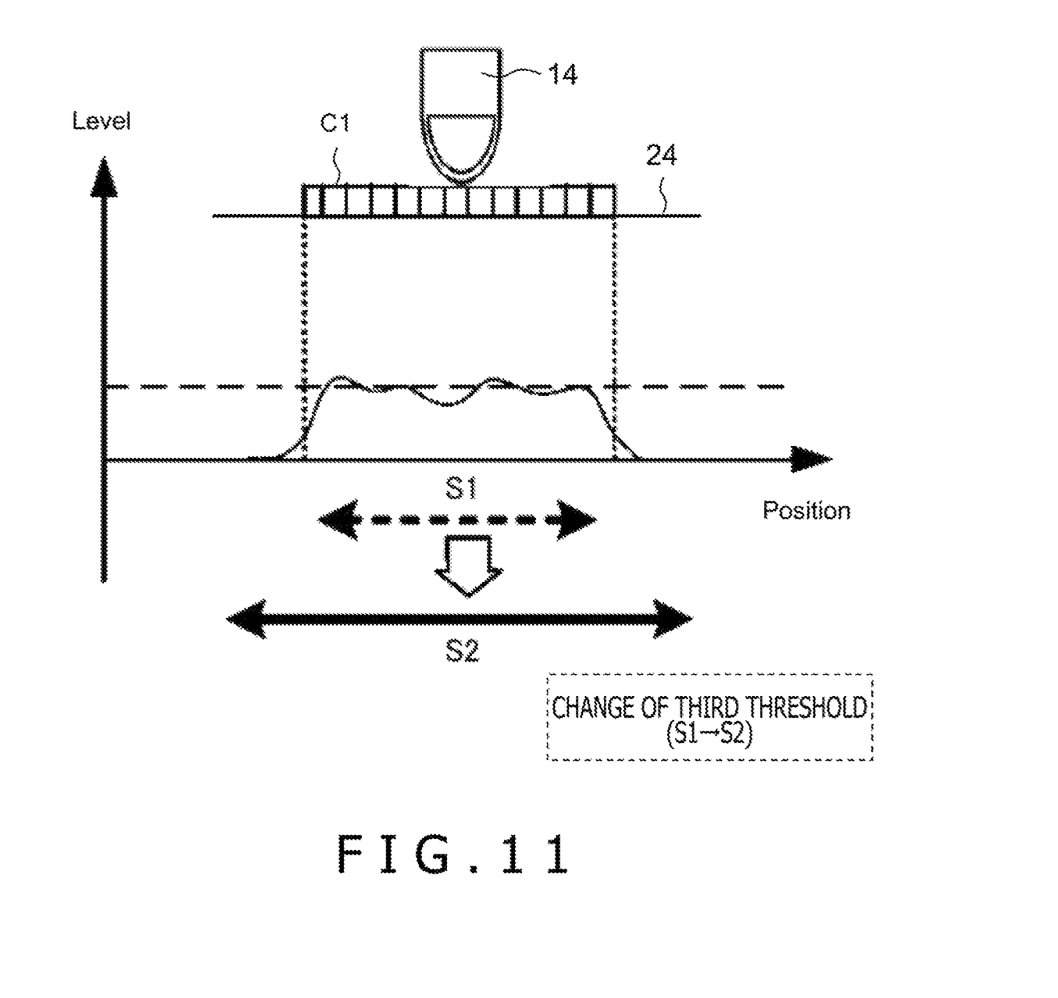
FIG. 11 is a schematic diagram depicting an effect of improving palm determination following a change of threshold (S1→S2).

Next, at S53, the position detection circuit 18 performs the "palm determination" using a threshold S2 higher than the threshold S1 used in the normal mode. For example, since if a coin pattern is detected in the palm determination, the coin pattern is excluded from a touch area, touch manipulation by the finger 14 is more easily invalidated. In particular, such influence becomes more significant in cases where the foreign object C1 is highly fluid (for example, a water drop, etc.). In view of this, in the coin mode, the threshold S2 is used instead of the threshold S1 to lower the palm area detection sensitivity. Thereby, as depicted in FIG. 11, invalidation of touch manipulation by the finger 14 is suppressed even if the foreign object C1 is interposed.

Last, at S54, the position detection circuit 18 outputs touch positions (coordinate values) in the foreign object present area 34 according to results of determination at S51 to S53.

[Effects of Position Detection Circuit 18]

In the above-mentioned manner, the position detection circuit 18 is a circuit connected to the capacitive touch sensor 16 formed with a plurality of line electrodes 16x, 16y that are two-dimensionally arranged, in which the position detection circuit 18 performs: acquiring the two-dimensional data 30 indicating a distribution of detection values regarding capacitance on the touch sensor 16 (S1); recognizing the electrically conductive foreign objects C1 and C2 located above the touch sensor 16 based on the acquired two-dimensional data 30 (S2); and detecting a touch position or touch area on the touch sensor 16 based on the two-dimensional data 30 using different touch detection conditions for the outside and inside of the foreign object present area 34 where the recognized foreign objects C1 and C2 are present (S4, S5).

Because of such a configuration, more flexible position detection can be performed even if the foreign objects C1 and C2 are present above the touch sensor 16 (on the touch surface 24). For example, by setting touch detection conditions that are each appropriate for the foreign object present area 34 and the normal detection area 36, position detection is performed equally without being aware of the presence or absence of the foreign objects C1 and C2.

In addition, with this detecting, if a touch detection condition under which a position or area where a detection value indicated by the two-dimensional data 30 is larger than a threshold (T1, T2) is detected as a touch position or touch area is used, the threshold (T1) for the outside of the foreign object present area 34 may be relatively increased, and the threshold (T2) for the inside of the foreign object present area 34 may be relatively lowered. By relatively increasing the touch detection sensitivity in the foreign object present area 34, touch from above the foreign objects C1 and C2 is more easily detected.

In addition, with this detecting, if a touch detection condition under which adjoining touch areas are detected as a single touch area if a change amount between detection values of the adjoining touch areas is smaller than a threshold (L1, L2) is used, the threshold (L1) for the outside of the foreign object present area 34 may be relatively lowered, and the threshold (L2) for the inside of the foreign object present area 34 may be relatively increased. By relatively lowering the discontinuity detection sensitivity in the foreign object present area 34, the foreign objects C1 and C2 are more easily detected as a single object.

In addition, with this detecting, if a touch detection condition under which a detected area is excluded from a touch area if the size of the detected area is larger than a threshold (S1, S2), the threshold (S1) for the outside of the foreign object present area 34 may be relatively lowered, and the threshold (S2) for the inside of the foreign object present area 34 may be relatively increased. By relatively lowering the sensitivity of detecting a touch area to be excluded (that is, a palm area), invalidation of touch manipulation is more easily suppressed even if the foreign objects C1 and C2 are interposed.

In addition, with this recognizing, the foreign objects C1 and C2 may be recognized if there is an area where positive signal levels and negative signal levels are mixedly present in the distribution of detection values indicated by the two-dimensional data 30. By considering the capacitance detection tendency depicted in FIG. 4A and FIG. 4B, the precision of recognizing the foreign objects C1 and C2 improves.

What is claimed is:

1. A position detection circuit connected to a capacitive touch sensor formed with a plurality of line electrodes that are two-dimensionally arranged, comprising:
   at least one processor device; and
   at least one memory device storing processor-readable instructions that, when executed by the at least one processor device, cause the position detection circuit to:
      acquire two-dimensional data indicating a distribution of detection values regarding capacitance on the touch sensor;
      recognize an electrically conductive object located above the touch sensor based on the acquired two-dimensional data if there is an area where a positive signal level and a negative signal level are mixedly present in the distribution of the detection values; and
      detect a touch position or touch area on the touch sensor based on the two-dimensional data using different touch detection conditions for an outside and an inside of an area where the recognized object is present.

2. The position detection circuit according to claim 1, wherein the instructions, when executed by the at least one processor device, cause the position detection circuit to:
   if a touch detection condition under which a position or area where a detection value indicated by the two-dimensional data is larger than a threshold is detected as the touch position or the touch area is used,
   relatively increase the threshold for the outside of the area where the recognized object is present, and relatively lower the threshold for the inside of the area where the recognized object is present.

3. The position detection circuit according to claim 1, wherein the instructions, when executed by the at least one processor device, cause the position detection circuit to:
   if a touch detection condition under which adjoining touch areas are detected as a single touch area if a change amount between detection values of the adjoining touch areas is smaller than a threshold is used,
   relatively lower the threshold for the outside of the area where the recognized object is present, and relatively increase the threshold for the inside of the area where the recognized object is present.

4. The position detection circuit according to claim 1, wherein the instructions, when executed by the at least one processor device, cause the position detection circuit to:
   if a touch detection condition under which a detected area is excluded from the touch area when a size of the detected area is larger than a threshold is used,
   relatively lower the threshold for the outside of the area where the recognized object is present, and relatively increase the threshold for the inside of the area where the recognized object is present.

5. A position detection method using a capacitive touch sensor formed with a plurality of line electrodes that are two-dimensionally arranged, wherein the method is performed by one or more processors and comprises:
   acquiring two-dimensional data indicating a distribution of detection values of capacitance on the touch sensor;

recognizing an electrically conductive object located above the touch sensor based on the acquired two-dimensional data if there is an area where a positive signal level and a negative signal level are mixedly present in the distribution of the detection values; and detecting a touch position or touch area on the touch sensor based on the two-dimensional data using different touch detection conditions for an outside and an inside of an area where the recognized object is present.

6. The position detection method according to claim 5, wherein the detecting includes:

if a touch detection condition under which a position or area where a detection value indicated by the two-dimensional data is larger than a threshold is detected as the touch position or the touch area is used, relatively increasing the threshold for the outside of the area where the recognized object is present, and relatively lowering the threshold for the inside of the area where the recognized object is present.

7. The position detection method according to claim 5, wherein the detecting includes:

if a touch detection condition under which adjoining touch areas are detected as a single touch area when a change amount between detection values of the adjoining touch areas is smaller than a threshold is used, relatively lowering the threshold for the outside of the area where the recognized object is present, and relatively increasing the threshold for the inside of the area where the recognized object is present.

8. The position detection method according to claim 5, wherein the detecting includes:

if a touch detection condition under which a detected area is excluded from the touch area when a size of the detected area is larger than a threshold is used, relatively lowering the threshold for the outside of the area where the recognized object is present, and relatively increasing the threshold for the inside of the area where the recognized object is present.

9. An electronic device, comprising:

a capacitive touch sensor formed with a plurality of line electrodes that are two-dimensionally arranged; and a position detection circuit connected to the capacitive touch sensor, wherein the position detection circuit includes at least one processor device, and at least one memory device storing processor-readable instructions that, when executed by the at least one processor device, cause the position detection circuit to:

acquire two-dimensional data indicating a distribution of detection values regarding capacitance on the touch sensor;

recognize an electrically conductive object located above the touch sensor based on the acquired two-dimensional data if there is an area where a positive signal level and a negative signal level are mixedly present in the distribution of the detection values; and detect a touch position or touch area on the touch sensor based on the two-dimensional data using different touch detection conditions for an outside and an inside of an area where the recognized object is present.

10. The electronic device according to claim 9, wherein the instructions, when executed by the at least one processor device, cause the position detection circuit to:

if a touch detection condition under which a position or area where a detection value indicated by the two-dimensional data is larger than a threshold is detected as the touch position or the touch area is used, relatively increase the threshold for the outside of the area where the recognized object is present, and relatively lower the threshold for the inside of the area where the recognized object is present.

11. The electronic device according to claim 9, wherein the instructions, when executed by the at least one processor device, cause the position detection circuit to:

if a touch detection condition under which adjoining touch areas are detected as a single touch area if a change amount between detection values of the adjoining touch areas is smaller than a threshold is used, relatively lower the threshold for the outside of the area where the recognized object is present, and relatively increase the threshold for the inside of the area where the recognized object is present.

12. The electronic device according to claim 9, wherein the instructions, when executed by the at least one processor device, cause the position detection circuit to:

if a touch detection condition under which a detected area is excluded from the touch area when a size of the detected area is larger than a threshold is used, relatively lower the threshold for the outside of the area where the recognized object is present, and relatively increase the threshold for the inside of the area where the recognized object is present.

13. A position detection circuit connected to a capacitive touch sensor formed with a plurality of line electrodes that are two-dimensionally arranged, comprising:

at least one processor device; and at least one memory device storing processor-readable instructions that, when executed by the at least one processor device, cause the position detection circuit to:

acquire two-dimensional data indicating a distribution of detection values regarding capacitance on the touch sensor;

recognize an electrically conductive object located above the touch sensor based on the acquired two-dimensional data;

detect a touch position or touch area on the touch sensor based on the two-dimensional data using different touch detection conditions for an outside and an inside of an area where the recognized object is present; and if a touch detection condition under which a position or area where a detection value indicated by the two-dimensional data is larger than a threshold is detected as the touch position or the touch area is used, relatively increase the threshold for the outside of the area where the recognized object is present, and relatively lower the threshold for the inside of the area where the recognized object is present.

14. A position detection method using a capacitive touch sensor formed with a plurality of line electrodes that are two-dimensionally arranged, wherein the method is performed by one or more processors and comprises:

acquiring two-dimensional data indicating a distribution of detection values of capacitance on the touch sensor;

recognizing an electrically conductive object located above the touch sensor based on the acquired two-dimensional data;

detecting a touch position or touch area on the touch sensor based on the two-dimensional data using different touch detection conditions for an outside and an inside of an area where the recognized object is present; and if a touch detection condition under which a position or area where a detection value indicated by the two-dimensional data is larger than a threshold is detected as the touch position or the touch area is used, relatively increasing the threshold for the outside of the area where the recognized object is present, and relatively lowering the threshold for the inside of the area where the recognized object is present.

15. An electronic device, comprising:

a capacitive touch sensor formed with a plurality of line electrodes that are two-dimensionally arranged; and a position detection circuit connected to the capacitive touch sensor, wherein the position detection circuit includes at least one processor device, and at least one memory device storing processor-readable instructions that, when executed by the at least one processor device, cause the position detection circuit to:

acquire two-dimensional data indicating a distribution of detection values regarding capacitance on the touch sensor;

recognize an electrically conductive object located above the touch sensor based on the acquired two-dimensional data;

detect a touch position or touch area on the touch sensor based on the two-dimensional data using different touch detection conditions for an outside and an inside of an area where the recognized object is present; and if a touch detection condition under which a position or area where a detection value indicated by the two-dimensional data is larger than a threshold is detected as the touch position or the touch area is used, relatively increase the threshold for the outside of the area where the recognized object is present, and relatively lower the threshold for the inside of the area where the recognized object is present.

* * * * *